US00RE47718E

(19) United States
(12) Reissued Patent
Lee et al.

(10) Patent Number: US RE47,718 E
(45) Date of Reissued Patent: Nov. 5, 2019

(54) METHOD OF TRANSMITTING/RECEIVING DIGITAL CONTENTS AND APPARATUS FOR RECEIVING DIGITAL CONTENTS

(71) Applicant: LG ELECTRONICS, INC., Seoul (KR)

(72) Inventors: Joon Hui Lee, Seoul (KR); Ho Taek Hong, Seoul (KR); Jin Pil Kim, Seoul (KR)

(73) Assignee: LG ELECTRONICS INC., Seoul (KR)

(21) Appl. No.: 14/693,402

(22) Filed: Apr. 22, 2015

Related U.S. Patent Documents

Reissue of:
(64) Patent No.: 8,429,284
Issued: Apr. 23, 2013
Appl. No.: 12/003,948
Filed: Jan. 3, 2008

U.S. Applications:
(63) Continuation of application No. 14/692,464, filed on Apr. 21, 2015, now abandoned, which is an application for the reissue of Pat. No. 8,429,284.

(30) Foreign Application Priority Data

Jan. 10, 2007 (KR) ..... 10-2007-0003094

(51) Int. Cl.
*H04N 7/173* (2011.01)
*H04N 21/43* (2011.01)
(Continued)

(52) U.S. Cl.
CPC ..... *H04N 7/17318* (2013.01); *H04L 65/4076* (2013.01); *H04L 67/16* (2013.01);
(Continued)

(58) Field of Classification Search
CPC ..... H04N 7/17318; H04N 21/242
(Continued)

(56) References Cited

U.S. PATENT DOCUMENTS 5,774,664 A 6/1998 Hidary et al.
6,219,712 B1 * 4/2001 Mann et al. ..... H04L 29/00 709/232
(Continued)

FOREIGN PATENT DOCUMENTS

KR 10-2003-0037138 A 5/2003
KR 10-2005-0093451 A 9/2005
KR 10-2006-0067849 A 6/2006

OTHER PUBLICATIONS

Shihui, et al.: "Proposed NGN/IMS Independent IPTV Architecture", IP&Multimedia Research Department, Institute of Communication Standards Research, 1-4244-0463-0/06, 2006 IEEE.
(Continued)

*Primary Examiner* — Woo H. Choi
(74) *Attorney, Agent, or Firm* — Dentons US LLP

(57) ABSTRACT

A method of transmitting/receiving digital contents and an apparatus for receiving the digital contents are disclosed. In a system connected with an Internet protocol (IP) network, service event information may be included in a service discovery record and transmitted/received. Accordingly, the apparatus for receiving the digital contents can receive a service using the service event information in a service discovery step when receiving the service including the digital contents. Since the service event information can be processed independence of the digital contents included in the service, the service can be rapidly provided and unnecessary service event information does not need to be parsed.

7 Claims, 17 Drawing Sheets

(51) Int. Cl.

| | |
|---|---|
| ***H04N 21/6405*** | (2011.01) |
| ***H04N 21/643*** | (2011.01) |
| ***H04L 29/08*** | (2006.01) |
| ***H04L 29/06*** | (2006.01) |
| ***H04N 21/242*** | (2011.01) |
| ***H04N 21/6408*** | (2011.01) |
| ***H04N 21/235*** | (2011.01) |
| ***H04N 21/61*** | (2011.01) |
| ***H04N 21/435*** | (2011.01) |

(52) U.S. Cl.
CPC ..... *H04N 21/235* (2013.01); *H04N 21/242* (2013.01); *H04N 21/4302* (2013.01); *H04N 21/435* (2013.01); *H04N 21/6125* (2013.01); *H04N 21/6405* (2013.01); *H04N 21/6408* (2013.01); *H04N 21/64322* (2013.01)

(58) Field of Classification Search
USPC ..... 709/201, 231
See application file for complete search history.

(56) References Cited

U.S. PATENT DOCUMENTS 6,473,804 B1 10/2002 Kaiser et al.
6,526,580 B2 * 2/2003 Shimomura ..... H04N 7/17318 348/E7.071
6,630,963 B1 10/2003 Billmaier
6,778,834 B2 * 8/2004 Laitinen et al. ..... 455/450
7,899,915 B2 * 3/2011 Reisman ..... G06F 17/30873 709/227
8,014,403 B2 * 9/2011 Amonou ..... G06F 17/2247 370/395.1
8,042,132 B2 10/2011 Carney et al.
8,078,669 B2 * 12/2011 Ladd ..... G06F 9/44526 370/352
8,214,422 B1 * 7/2012 Woodward, Jr. ..... H04N 21/25808 709/201
8,219,134 B2 * 7/2012 Maharajh ..... G06F 17/30035 455/3.01
8,230,343 B2 * 7/2012 Logan ..... G06F 17/30265 386/291
8,566,887 B2 * 10/2013 Hasek ..... H04N 7/17318 725/94
8,626,005 B2 1/2014 Hiraike
8,626,055 B2 * 1/2014 Hwang ..... H04H 60/04 455/3.01
2002/0065936 A1 * 5/2002 Schiuma ..... 709/238
2002/0143944 A1 * 10/2002 Traversat et al. ..... 709/225
2003/0149794 A1 * 8/2003 Morris et al. ..... 709/249
2006/0064716 A1 * 3/2006 Sull et al. ..... 725/37
2006/0259602 A1 * 11/2006 Stewart et al. ..... 709/223
2007/0124359 A1 5/2007 Hwang et al.
2008/0022322 A1 * 1/2008 Grannan et al. ..... 725/78
2008/0066111 A1 * 3/2008 Ellis et al. ..... 725/57
2008/0092199 A1 * 4/2008 McCarthy et al. ..... 725/133

OTHER PUBLICATIONS

Digital Video Broadcasting (DVB): Transport of MPEG-2 Based DVB Services over IP XP014039759—Sep. 2006.
"Digital Video Broadcasting (DVB); Specification for Service Information (SI) in DVB Systems" XP014001579 (May 2003).
Stallard,+ Tandberg Television, T. Paila: "DVB Thoughts on Service Discovery" XP015005363 (Feb. 2003).
"Requirements to NorDig Complaint IRDs for IP-based Networks" XP002480026—retrieved on Aug. 12, 2006.

* cited by examiner

FIG. 6A

| SI type : | /BroadcastDiscoveryServiceList/Single Service/SI | |
|---|---|---|
| @ServiceType | Specifies the type of service; it shall be coded as per DVB SI standard 1. Examples are digital television service, digital radio sound service, mosaic service, data broadcast service, DVB MHP service, etc. | M (see note) |
| @PrimarySISource | Indicates which source of service information to give priority (XML record or DVB SI) in cast DVB SI tables are present. | O |
| Name | Name of the service for display in one or more languages; one Service name is allowed per language code, and at least one language shall be provided (though not necessarity more than one). | M |
| Description | Description of the service for potential display in one or more languages; one descroption per language code maximum. | O |
| ServiceDescriptionLocation | If present, this shall contain the identifier(s) of the BCG Record(s) for the BCG Discovery element that carries the information on this service. If this element is present, it shall be used in preference to the ServicesDescriptionLocation. | O |
| @preferred | If present, specifies that this location contains the preferred BCG. The default value for this attribute is false. There shall be only one preferred BCG. | O |
| ContentGenre | Indicates one or more genre of the service (not individual programmes). For example movie/drama channel or news/current affairs channel. this shall use the first level coding defined by DVB [1] as content_nibble_level_1. | O |
| CountryAvailability | Gives a list of countries and/or groups of countries where the service is intended to be available, and/or a list of countries and/or groups where it is not. | O |
| AnnouncementSuppor | The announcement support element identifies the type of spoken announcements that are supported by the service (for example emergency flash, road traffic flash, etc.). Furthermore, it informs about the transport method of the announcement and gives the necessary linkage information so the the announcement stream can be monitored. | O |
| Replacement Service | Identifies a service replacement service which may be selected automatically by the HNED when the service being decoded fails. | O |
| MosaicDescription | The mosaic description element identifies the elementary cells of a mosaic service, groups different elementary cells to form logical cells, and establishes a link between the content of all or part of the logical cell and the corresponding service or package information. | O |

FIG. 6B

| | | |
|---|---|---|
| EIpf type : | /BroadcastDiscovery/ServiceList/SingleService/EIpf | |
| @EventType | Specifies the type of event, it shall be present or following | M |
| @EventID | Identifies the event. | M |
| @StartTime | Signals the start time of the event. in Universal Time. | M |
| @Duration | Signals the duration of the event in hours, minutes, seconds. | M |
| @RunningStatus | Signals the status of the event. It shall be coded as DVB SI standard 1. | M |
| @PrimaryEIpfSource | Indicates which source of present/following event information to give prioity (XML record or DVB SI) in case DVB SI tables are present. | O |
| Name | Name of the event for display in one or more languages; one Event name is allowed per language code, and at least one language shall be provided (though not necessarily more than one). | M |
| Description | Description of the event for potential display in one or more languages; one description per lagnuage code maximum. | O |
| EventDescriptionLocation | If present, this shall contain the identifier(s) of the BCG Record(s) for the BCG Discovery element that carries the information on this event. | O |
| @preferred | If present, specifies that this location contains the preferred BCG. The default value for this attribute is false. There shall be only one preferred BCG. | O |
| ContentGenre | Indicates one or more genre of the event. For example movie/drama program or news/current affairs channel. This shall use the first level and the second level coding defined by DVB [1] as content_nibble_level_1 and contant_nibble_ level_2. | O |
| ComponentDescription | The component description element identifies all streams that are attached to an event. It may point a component stream in the same event. And it also may point a CRI content or IMI instance. | O |
| ReplacementEvent | Identifies a event replacement event which may be selected automatically be the HNED whem the event being decoded fails. | O |
| ParentalRatingDescription | Gives a list of rating values which are rated by one or more country. | O |

FIG. 7A

```
<xsd:complexType name="EI">
  <xsd:annotation>
    <xsd:documentation>Implementation of traditional DVB SI information about a event</xsd:documentation>
  </xsd:annotation>
  <xsd:sequence>
    <xsd:element name="Name" type="dvb:MultilingualType" maxOccurs="unbounded"/>
    <xsd:element name="Description" type="dvb:MultilingualType" minOccurs="0" maxOccurs="unbounded"/>
    <xsd:element name="EventDescriptionLocation" type="dvb:DescriptionLocationBCG" minOccurs="0" maxOccurs="unbounded"/>
  maxOccurs="unbounded"/>
    <xsd:element name="ContentGenre" type="dvb:Genre2Level" minOccurs="0" maxOccurs="unbounded"/>
    <xsd:element name="ComponentDescription" type="dvb:ComponentDescription" minOccurs="0"/>
    <xsd:element name="ReplacementEvent" type="dvb:ReplacementService" minOccurs="0" maxOccurs="unbounded"/>
    <xsd:element name="ParentalRating" type="dvb:ParentalRating" minOccurs="0" maxOccurs="unbounded"/>
  </xsd:sequence>
  <xsd:attribute name="EventType" type="dvb:EventType" use="required"/>
  <xsd:attribute name="EventID" type="dvb:EventId" use="required"/>
  <xsd:attribute name="StartTime" type="xsd:dateTime" use="required"/>
  <xsd:attribute name="Duration" type="xsd:time" use="required"/>
  <xsd:attribute name="RunningStatus" type="dvb:RunningStatus" use="required"/>
  <xsd:attribute name="PrimaryEISource" type="dvb:PrimaryEISource" use="optional" default="XML"/>
</xsd:complexType>
```

FIG. 7B

```
<xsd:simpleType name="EventId">
  <xsd:annotation>
    <xsd:documentation xml:lang="en">A number used to identify
                                     a event within a service.</xsd:documentation>
  </xsd:annotation>
  <xsd:restriction base="xsd:unsignedShort"/>
</xsd:simpleType>

<xsd:simpleType name="EventType">
  <xsd:annotation>
    <xsd:documentation xml:lang="en">The "Type" of a event
                                     (e.g. present/following, ...). </xsd:documentation>
  </xsd:annotation>
  <xsd:restriction base="xsd:string">
    <xsd:enumeration value="Present"/>
    <xsd:enumeration value="Following"/>
  </xsd:restriction>
</xsd:simpleType>

<xsd:simpleType name="RunningStatus">
  <xsd:restriction base="dvb:Hexadecimal3bit"/>
</xsd:simpleType>

<xsd:simpleType name="PrimaryEISource">
  <xsd:restriction base="xsd:string">
    <xsd:enumeration value="Stream"/>
    <xsd:enumeration value="XML"/>
  </xsd:restriction>
</xsd:simpleType>

<xsd:complexType name="Genre2Level">
  <xsd:sequence>
    <xsd:element name="FirstLevel" type="dvb:Genre"/>
    <xsd:element name="SecondLevel" type="dvb:Genre" minOccurs="0"/>
  </xsd:sequence>
</xsd:complexType>

<xsd:complexType name="ComponentDescription">
  <xsd:sequence>
    <xsd:element name="Name" type="dvb:MultilingualType" maxOccurs="unbounded"/>
    <xsd:element name="Description" type="dvb:MultilingualType" minOccurs=
                        "0" maxOccurs="unbounded"/>
    <xsd:choice minOccurs="0">
      <xsd:element name="TextualIdentifier" type="dvb:TextualIdentifier"/>
      <xsd:element name="DVBTriplet" type="dvb:DVBTriplet"/>
    </xsd:choice>
  </xsd:sequence>
  <xsd:attribute name="StreamContent" type="dvb:Hexadecimal4bit" use="required"/>
  <xsd:attribute name="ComponentType" type="dvb:Hexadecimal8bit" use="required"/>
  <xsd:attribute name="ComponentTag" type="dvb:Hexadecimal8bit" use="required"/>
</xsd:complexType>

<xsd:complexType name="ParentalRating">
  <xsd:attribute name="Countries" type="dvb:ISO-3166-List" use="required"/>
  <xsd:attribute name="Rating" type="dvb:Hexadecimal8bit" use="required" default=""/>
</xsd:complexType>
```

| Payload ID value | SD&S record carried |
|---|---|
| 0x00 | Reserved |
| 0x01 | Service Provider Discovery Information |
| 0x02 | Broadcast Discovery Information |
| 0x03 | COD Discovery Information |
| 0x04 | Services from other SPs |
| 0x05 | Package Discovery Information |
| 0x06 | BCG Discovery Information |
| 0x07 to 0xEF | Reserved |
| 0xF0 to 0xFF | User Private |
| 0xA0 | Broadcast Event Information |

FIG. 17

```
    <xsd:complexType name="IPService">
      <xsd:sequence>
        <xsd:element name="ServiceLocation" type="dvb:ServiceLocation"/>
        <xsd:element name="TextualIdentifier" type="dvb:TextualIdentifier"/>
        <xsd:element name="DVBTriplet" type="dvb:DVBTriplet"/>
        <xsd:element name="MaxBitrate" type="xsd:positiveInteger" minOccurs="0"/>
        <xsd:element name="SI" type="dvb:SI" minOccurs="0"/>
        <xsd:choice minOccurs="0">
(a) ←—  <xsd:element name="EI" type="dvb:EI" maxOccurs="2"/>
(b) ←—  <xsd:element name="EIRefeence" maxOccurs="2"/>
        </xsd:choice>
        <xsd:element name="AudioAttibutes" type="tva:AudioAttributesType"
                          minOccurs="0" maxOccurs="unbounded"/>
        <xsd:element name="VideoAttibutes" type="tva:VideoAttributesType"
                          minOccurs="0" maxOccurs="unbounded"/>
      </xsd:sequence>
    </xsd:complexType>

(c) ←—  <xsd:complexType name="EIReference">
        <xsd:attribute name="EventID" type="dvb:EventId" use="required"/>
    </xsd:complexType>

(d) ←—  <xsd:complexType name="BroadcacstEventInformation">
        <xsd:sequence maxOccurs="unbounded">
          <xsd:element name="TextualIdentifier" type="dvb:TextualIdentifier"/>
          <xsd:element name="DVBTriplet" type="dvb:DVBTriplet"/>
          <xsd:element name="EI" type="dvb:EI" maxOccurs="2"/>
        </xsd:sequence>
    </xsd:complexType>
```

METHOD OF TRANSMITTING/RECEIVING DIGITAL CONTENTS AND APPARATUS FOR RECEIVING DIGITAL CONTENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 8,429,284 B2, including reissue application Ser. Nos. 14/692,464, and 14/693,402, (the present application) which is a continuation reissue application of reissue application Ser. No. 14/692,464.*

This application *is a continuation reissue application of U.S. application Ser. No. 14/692,464 filed on Apr. 22, 2015, which is a reissue application of U.S. application Ser. No. 12/003,948 filed Jan. 3, 2008, now U.S. Pat. No. 8,429,284 B2 issued Apr. 23, 2013, which* claims the benefit of Korean Patent Application No. 10-2007-0003094[.] filed on Jan. 10, 2007, *all of* which [is] *are* hereby incorporated by reference as if fully set forth herein.

BACKGROUND OF THE INVENTION

1. Field of the Invention

The present invention relates to a method of transmitting/receiving digital contents and an apparatus for receiving the digital contents.

2. Discussion of the Related Art

In the existing television (TV) system, contents created by a broadcasting station are transmitted via a wave propagation medium such as terrestrial, cable or satellite broadcasting such that viewers view a broadcasting signal transmitted via the wave propagation medium using a TV receiver. Hereinafter, the digital contents are the general term for substantial data or information which can be received through a recording medium having digital data recorded thereon and wired/wireless communication such as broadcasting, Internet or mobile communication and includes, for example, programs in a broadcasting service.

However, in the existing analog broadcasting, as a digital-based TV technology has been developed and commercialized, a variety of contents such as real-time broadcasting, contents on Demand (CoD), games or news have been provided to viewers using the Internet connected to individual homes, in addition to the existing wave propagation medium.

An example of provision of the contents using the Internet includes an Internet protocol TV (IPTV) system. The IPTV system indicates a service for providing an information service, moving-image contents and broadcasting to a television receiver using the super-high Internet.

In addition to various IPTV services, there is a need for a hybrid service which is a combination of digital broadcasting such as terrestrial/satellite/cable and the IPTV service.

Conventionally, in order to acquire event information of a broadcasting service received through an IP network, a method of extracting a service information table from the received transport stream (TS) was used. According to the conventional method, since the service event information should be included in a multicast stream of live media broadcasting, a large amount of service event information lays a burden on the use of the network.

In particular, in order to provide the hybrid service including a combination of various services, since information on the services or contents should be first known, the acquisition of the service event information using the conventional method places restrictions on the provision of the hybrid service.

SUMMARY OF THE INVENTION

Accordingly, the present invention is directed to a method and apparatus for transmitting/receiving digital contents that substantially obviate one or more problems due to limitations and disadvantages of the related art.

An object of the present invention is to provide a method of transmitting/receiving digital contents, which are capable of readily transmitting/receiving service event information through communication using an IP protocol, and an apparatus for receiving the digital contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving digital contents receives a service discovery record including service event information. The received service discovery record is parsed. The service event information is obtained from the parsed service discovery record.

In accordance with another aspect of the invention, a digital content receiving apparatus includes an interface which transmits/receives an IP packet; an IP manager which accesses a service discovery record including service event information through the interface and receives and processes the service discovery record according to an IP; a service discovery manager which parses the service discovery record and obtains service event information; a decoding unit which decodes the digital contents output from the interface; a controller which controls the service event information parsed by the service discovery manager and the decoded digital contents to be output; and an output unit which outputs at least one of the service event information and the digital contents according to a control signal of the controller.

In accordance with another aspect of the invention, a method of transmitting digital contents included in a service in a system connected by an IP network includes generating a service discovery record including service event information of the service. When the generated service discovery record is requested through the IP network, the service discovery record is transmitted through the IP network.

The service discovery record may include an identifier of a payload including only the service event information and the service event information included in the payload according to the identifier.

The service event information may include at least one of information indicating whether an event of the service event information is a present event or a following event, information for identifying a service event, information indicating a start time of the service event, information indicating a duration of the event, information indicating a running status of the event, and information indicating whether the service event information gives priority to information multiplexed with a transport stream of the digital contents or the information included in the service discovery record.

The service event information may include at least one of information indicating a name of the event information, information describing the event information, information for identifying a payload if the payload of the service discovery record including detailed information of the event is present, information describing components including the digital contents included in the service, information indicating replacement event information, with which the event information is replaced, and information indicating a parental rating of the service.

The information describing the components including the digital contents included in the service may include information on a stream component included in a transport stream different from a transport stream of the digital contents.

The information describing the components including the digital contents included in the service may include information on a stream component which can be received from a uniform resource identifier (URI) different from a URI of an IP packet for transmitting the digital contents.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A and 6B are views showing information included in service information (SI) and service event information (EI), respectively;

FIGS. 7A and 7B are views showing the service discovery record of the first example by an eXtensible markup language (XML) schema;

FIG. 17 is a view showing the service discovery record of the second example by the XML schema.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, for example, an IPTV system for transmitting/receiving digital contents will be described as the embodiments of the present invention, but the present invention is not limited to the IPTV system.

Figure 1A:
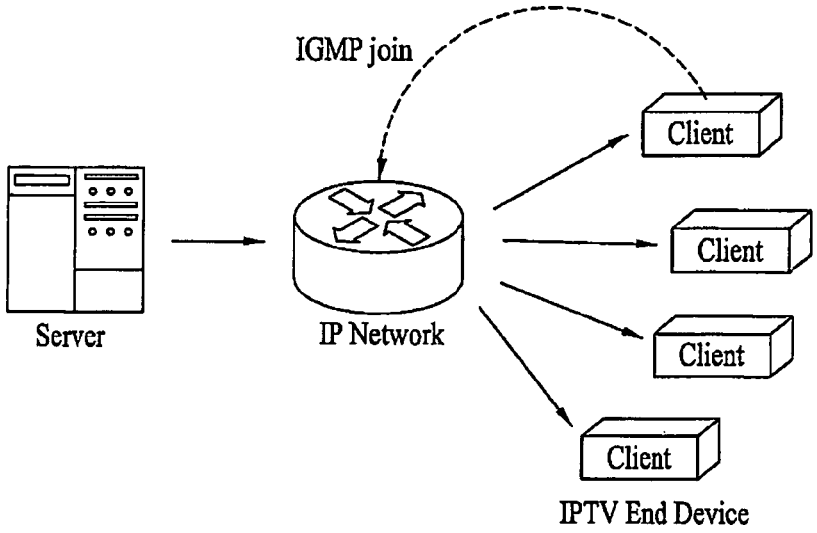
FIGS. 1A to 1C are conceptual diagrams showing an IPTV system.
Figure 1B:
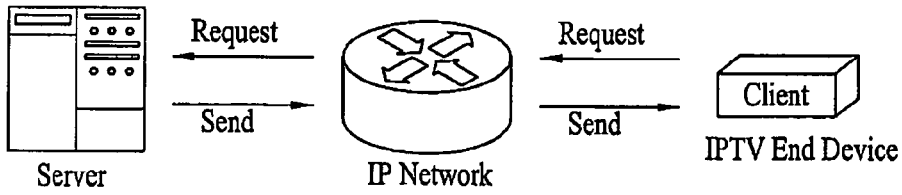
Figure 1C:
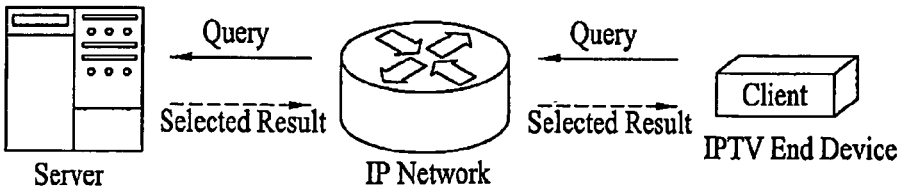

FIGS. 1A to 1C are conceptual diagrams showing an IPTV system, wherein FIG. 1A shows a multicast scheme, FIG. 1B shows a unicast scheme, and FIG. 1C shows a query.

The IPTV system for providing contents using the Internet largely includes a server, an IP network and a receiver (client). Since the receiver receives a service, the receiver is also called a client.

The multicast scheme of FIG. 1A indicates a scheme for transmitting data to a plurality of receivers included in a specific group. In the multicast scheme, the server can simultaneously transmit the data to the plurality of receivers, which are previously registered in the server.

The unicast scheme of FIG. 1B is a scheme for transmitting/receiving data between the server and the receiver in one-to-one correspondence. According to the unicast scheme, when the receiver makes a request for data to the server, the server sends the data to the receiver according to the request.

In FIG. 1C, when the receiver sends a query to the server, the server transmits a selected result to the receiver. The receiver can send the query to the server, discover necessary information, and obtain the result.

The server of the IPTV system includes servers for performing various functions, such as a service discovery server, a streaming server, a broadband contents guide (BCG) server, a client information server and a payment information server.

Among them, the streaming server transmits moving-image data encoded by a moving picture experts Group-2 (MPEG-2) or MPEG-4 using a RFC 1889: real-time transport protocol (RTP) and RFC 3605: RTP control protocol (RTCP). In a case of using the RFC 2326: real-time streaming protocol (RTSP), the receiver can control a moving-image stream received from the server to some extent using a function called a network trick play such as pause, replay or stop. The BCG server can store BCG data including schedule information of broadcasting contents and provide the stored BCG data to the receiver. The BCG data includes stream connection information through the RTSP/RTP to allow the receiver to access the streaming server.

In the below-described embodiment, service event information can be included in the BCG data and be provided to the receiver. Here, the service event information includes a service including transmitted digital contents, or schedule information of the service or detailed information associated with the service or contents. The detailed example of the service event information is shown in FIGS. 4 to 11.

Among the servers, the service discovery server may provide service discovery information to the receiver. Hereinafter, the service discovery information is also called a service discovery record. The service discovery information includes access information and service selection information of servers for providing a service including contents such as broadcasting, video on demand (VOD), games and BCG. In more detail, the service discovery record may include a broadcast discovery record including content discovery information associated with a broadcasting network, COD discovery information including content discovery information associated with VOD or COD, and BCG discovery information including discovery information associated with a broadcasting schedule.

In FIGS. 1A to 1C, the service discovery server may divide the services provided through a plurality of IP-based networks and provide the service discovery information, which allows the receiver to discover and select a service, to the receiver. The service discovery information may include a list of services which can be provided through the network or the location information of the services in the network such that the receiver discovers the service in the network.

The receiver may select the service using the service selection information in the service information (SI) record including the information associated with the transmission of the service received from the service discovery server. In the below-described embodiment, the service event information may be included in the service discovery information and be provided to the receiver.

A network system includes an Internet-based network and gateways. The gateways deliver general data and perform a multicast group management and a Quality of service (QOS) management using a protocol such as an Internet group management protocol (IGMP).

Hereinafter, an apparatus for receiving digital contents indicates an apparatus which can receive data through an Internet network and provide the data to a user. The apparatus for receiving the digital contents based on the IP includes IPTV settop, homenet gateway and IPTV embedded TV. The apparatus for receiving the digital contents can receive the service event information provided by the service discovery server in a service discovery step and select a service according to the service event information. Now, this will be described in detail.

First, a method of transmitting the digital contents will be described.

A system connected by an IP network is supposed.

The service discovery record including service event information of a service including digital contents is generated. When the generated service discovery record is requested through the IP network, the service discovery record is transmitted through the IP network. When the digital contents according to the service discovery record is requested through the IP network, the digital contents are transmitted through the IP network.

Figure 2:
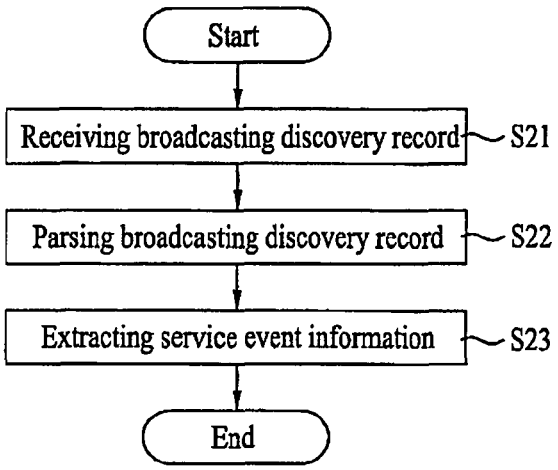
FIG. 2 is a flowchart illustrating a method of receiving digital contents.

FIG. 2 is a flowchart illustrating the method of receiving the digital contents.

Referring to FIG. 2, the method includes a step S21 of receiving the service discovery record including the service event information, a step S22 of parsing the received service discovery record, and a step S23 of extracting the service event information from the service discovery record.

In the step S21, the service discovery record including the service event information element is received. The service discovery record including the service event information element can be received according to a service discovery protocol (for example, a service discovery and selection (SD&S) or a service discovery protocol (SDP)). The step S21 is described in detail with reference to FIG. 3.

The service discovery record may include the service event information clement as well as the elements such as a service location, a TextualIdentifier and service information. The detailed example of the service discovery record will be described later. The TextualIdentifier is an element including a textual identifier for the location of the service.

Figure 3:
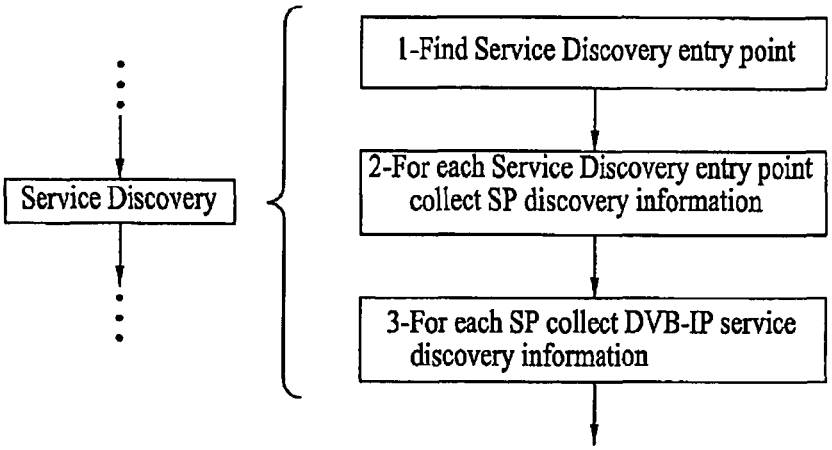
FIG. 3 is a view illustrating a step of receiving a service discovery record in FIG. 2.

FIG. 3 is a view showing the step of receiving the service discovery record of FIG. 2. First, the receiver finds a service discovery entry point (step 1). Here, the entry point is information for accessing the service such that the receiver receives the service, that is, initial access information or an initial access server for service connection. Each service discovery entry point collects information on a service provider (SP) for providing the service or the contents (step 2). Information necessary for selecting the collected service provider is obtained (step 3). As a protocol for transmitting/receiving the information which can find and select a service, the SD&/S may be used. The SD&S protocol defines, for example, a model for providing information which can find and select the service according to a communication concept shown in FIG. 1.

Referring to FIG. 2 again, in the step S22, the received service discovery record is parsed. The service discovery record may be XML format data. In the present embodiment, the service discovery record received according to the service discovery protocol is parsed. For example, the broadcast discovery information included in the service discovery information may include the service event information. In this case, the apparatus for receiving the digital contents parses the broadcast discovery information and obtain the service event information.

An identifier of a payload including the service event information may be included in the service discovery record. In this case, the service discovery record may include an identifier of the payload including the service event information and the service event information included in the payload according to the identifier. In this case, the apparatus for receiving the digital contents can parse the identifier of the payload including the service event information and the service event information included in the payload according to the identifier and obtain the service event information.

In the step S23, the service discovery record including the service event information is parsed and the service event information is obtained.

In the present embodiment, the service discovery record and the service event information are provided to the receiver such that the receiver can select the service by referring to the service discovery record and the service event information. In the embodiment of receiving the service discovery record and the service event information in the service discovery step, the service event information may have various data structures. Now, this is will be described in detail.

Figure 4:
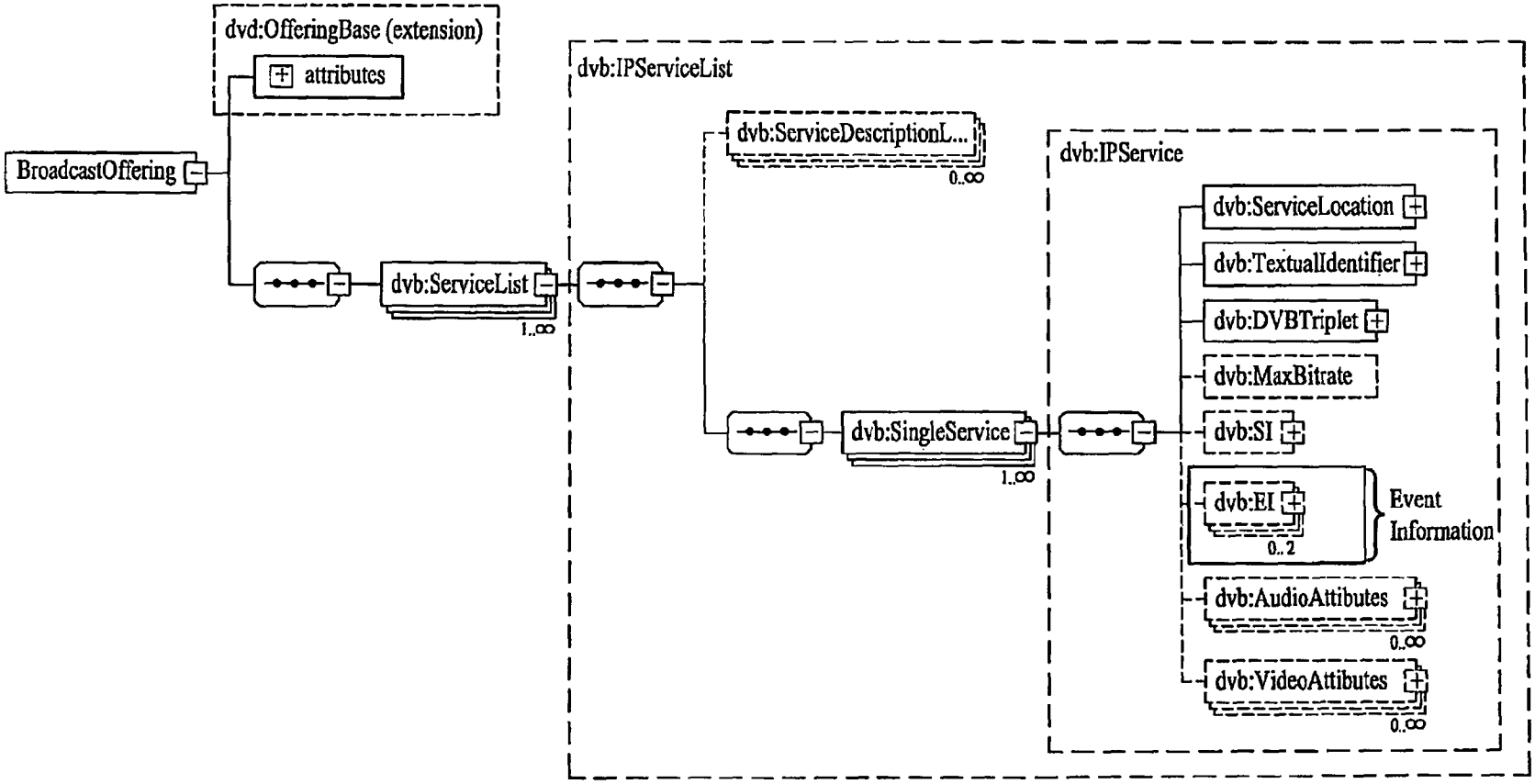
FIG. 4 is a view showing a first example of the service discovery record.
Figure 5:
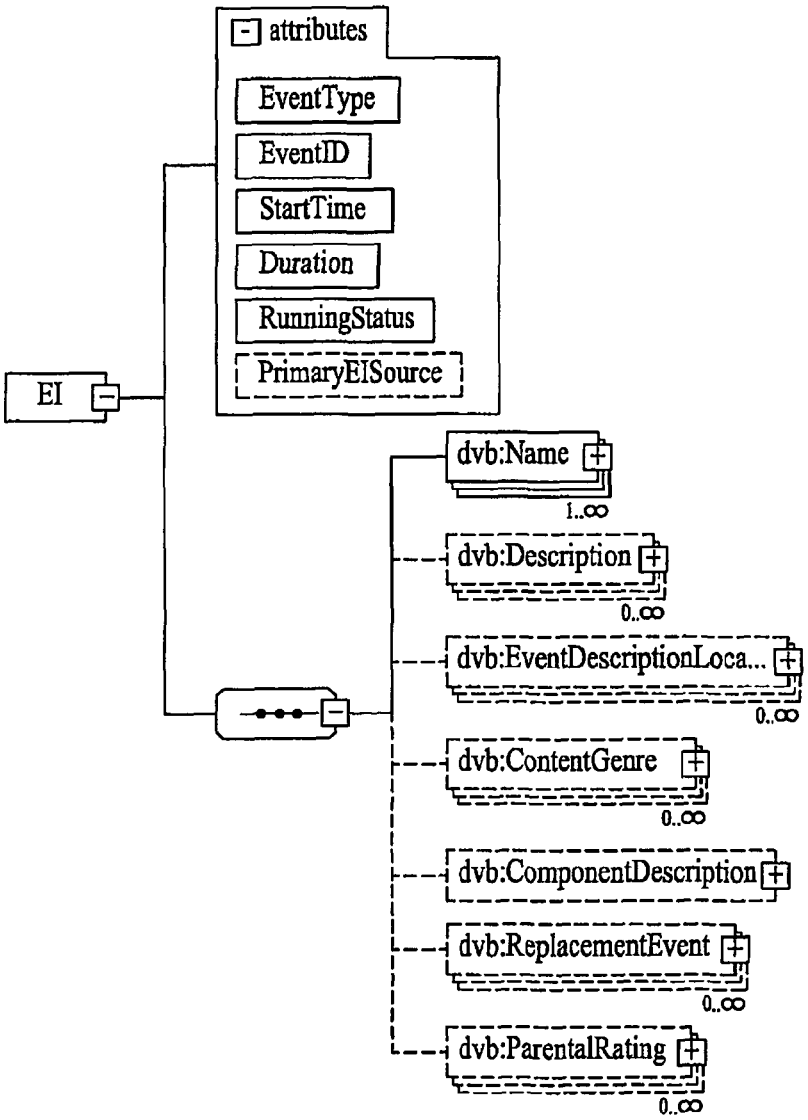
FIG. 5 is a view showing the structure of service event information of the first example of FIG. 4.

FIG. 4 is a view showing a first example of the service discovery record ('broadcastoffering' in FIG. 4) including the service event information. FIG. 5 is a view showing the structure of the attribute and a low-level element of the service event information element of the first example.

Referring to FIG. 4, the service provider provides the services and at least one (1 . . . ∞) service may be grouped to a ServiceList. The ServiceList includes a SingleService element which is the information on a single serve. The SingleService element may include event information element which is the service event information of the service described by the element.

The SingleService element including the information on the single service may include a service location element indicating the location of the service, a TextualIdentifier element including the textual identifier of the location of the service, and a Maxbitrate element including information on a maximum transmission bit rate of the service. The SingleService element may include a service event information (EI) element as well as a service information (SI) element including information associated with the transmission of the service. In FIG. 4, the service event information (EI) included in the service discovery record may be included in the element for identifying one service at the same hierarchical location as the service information (SI). The example of the service information (SI) in FIG. 4 is shown in detail in FIG. 6A.

FIG. 5 shows the example of the service event information shown in FIG. 4 in detail. Referring to FIG. 5, the service event information element may include the attribute of the service event and may include elements which describe the service event information.

The attribute of the service event information element will be first described. The attribute of the service event information element may include 'EventType', 'EventID', 'StartTime', 'Duration', 'RunningStatus', and 'PrimaryEISource'.

The event information element includes elements such as 'Name', 'Description', 'EventDescriptionLocation', 'ContentGenre', 'ComponentDescription', 'RelacementEvent', and 'ParentRatingDescription'.

The 'ParentRatingDescription' element describes information on parental lock. At this time, at least one of the low-level elements included in the event information element, such as the 'Name' element, is included in the service event information element and the remaining elements may be optional. The event information element shown in FIG. 5 is exemplary. An element describing other service event information may be added to the event information element shown in FIG. 5. The example of the attribute and the element shown in FIG. 5 is shown in detail in FIG. 6B.

FIGS. 6A and 6B are views showing the SI and the EI shown in FIG. 4, respectively. For the sake of convenience, the service information and the event information are divided and shown in FIGS. 6A and 6B. In FIGS. 6A and 6B, information having a prefix of @ represents the attribute.

FIG. 6A shows an example of the structure of the SI.

The SI type is an identifier describing service information. FIG. 6A indicates that the SI is located at the same location as /BroadcastDiscovery/ServiceList/SingleService/SI in the service discovery record.

The service information shown in FIG. 6A may follow, for example, the SI of the DVB system. '@Service Type' of FIG. 6A specifies the attribute of the type of the service and is coded as per the DVB SI of the service discovery record. '@PrimarySISource' indicates that the source of the service information having priority between the SI in the service discovery record (XML record) and the SI in the stream for transmitting the contents if the service information is included in the service discovery record and the stream for transmitting the contents. Namely, '@PrimarySISource' indicates which information has priority if the service information is included in both the transport stream (TS) in the IP stream for transmitting the contents and the service discovery record.

The 'Name' element includes the name information of the service displayed in one or more language. The 'Description' element includes the description information of the service which can be displayed in one or more language. The 'ServiceDescriptionLocation' element includes the identifier information for identifying the service discovery record (for example, the BCG record) including the information on the service according to the SI. For example, the service discovery record (for example, BCG record) according to the identifier of the service discovery record (for example, the BCG record) specified by the 'ServiceDescriptionLocation' element can describe the detailed SI. '@preferred' indicates whether preferred service discovery record (for example, the BCG record) is present.

The 'ContentGenre' element indicates the genre of the service. The 'CountryAvailability' element includes information on a group of the countries or information on a list of the countries to which the service can be provided. The 'AnnouncementSupport' element indicates the announcement type supported by the service and may include, for example, emergency flash, road traffic flash or the like.

The 'Replacement Service' element includes the identifier of a replacement service with which the service is replaced. The 'MosaicDescription' element includes the information for identifying the cells of the mosaic service if a mosaic service such as screen division is provided.

The 'EIpf type' describing the service event information of FIG. 6 may be included at the location represented by /broadcastDiscovery/ServiceList/SingleService/EIpf of the service discovery record. FIG. 6B indicates the location of the service event information element of the service discovery record shown in FIG. 4. The example of the attribute of the event information is as follows.

The 'EventType' attribute indicates whether the event which is currently being described, is the present event or the following event.

The 'EventID' attribute indicates the event ID for identifying the event. The receiver can identify the event according to this attribute.

The 'StartTime' attribute indicates the start time of the event.

The 'Duration' attribute indicates the duration of the event. The duration is the duration of the event and can be represented by hours, minutes or seconds.

The 'RunningStatus' attribute indicates the running status of the event.

The 'PrimaryEISource' attribute indicates the source of the service event information having priority between the SIs (for example, DVB SIs) in the stream for transmitting the contents or the service discovery record (XML record) if the present or following event information is included in the service discovery record and the stream for transmitting the contents, that is, indicates which of information has priority if the service event information is included in both the TS of the IP stream for transmitting the contents and the service discovery record. This attribute is optional and follows the rule determined as a default if this attribute value is not present. That is, the default may be the XML or the service event information included in the service information of the TS.

The 'Name' element indicates the name of the event which can be displayed on the screen of the receiver and can be displayed in one or more language. Only one event name is allowed for each language and at least one name is provided.

The 'Description' element is information which describes the event and includes information according to one or more language. One description is allowed for each language. The 'Description' element is optional and displays the event information in a language which is determined as a default value, if the value of this element is not present.

The 'EventDescriptionLocation' element specifies the identifier of the service discovery record (for example, the BCG record) if the payload (for example, the BCG record) of the service discovery record including the detailed information on the event is present. The service discovery record according to the identifier of the service discovery record (for example, the BCG record) specified in the 'EventDescriptionLocation' element can describe the detailed EI. For example, if the service discovery record (for example, the BCG record) according to the identifier of the service discovery record specified in the 'ServiceDescriptionLocation' element shown in FIG. 6 provides the SI, the service discovery record (for example, the BCG record) may include the detailed information on a specific event by the 'EventDescriptionLocation' element. This element is optional.

The 'preferred' attribute is included as the attribute value of the 'EventDescriptionLocation' element. That is, the 'EventDescriptionLocation' element can specify the preferred payload (for example, the BCG record) of the service discovery record.

The 'ContentGenre' element indicates the genre of the event. The 'ContentGenre' element is optional. The example of the 'ContentGenre' element is described in detail with reference to FIG. 8.

The 'ComponentDescription' of FIG. 6B may include the information which can identify and describe all streams belonging to the event. The 'ComponentDescription' element may indicate the component streams having the same service event information. For example, the 'ComponentDescription' element may be the information on the stream component, which has the same event as the TS of the digital contents to be received but is included in other TS.

In general, the TS of the terrestrial/satellite/cable broadcasting is identified by the stream identifier described in a program map section (PMT) of program specific information (PSI).

The system for receiving the digital contents using the IP can receive the stream through the IP packet according to an IP address other than the TS of the IP packet received from the present IP address. Accordingly, in order to identify the stream component which has the same event and is received through the IP network other than the IP network through which the component is received, the stream component can be identified by the URI. The detailed example thereof will be described with reference to FIGS. 9A to 9C. The 'ComponentDescription' element is optional.

Figure 10:
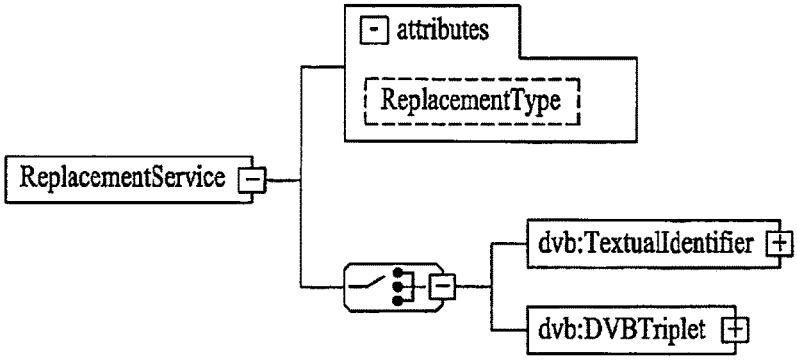
FIG. 10 is a view showing the structure of a 'ReplacementEvent' element.

The 'ReplacementEvent' element of FIG. 6B specifies an event replacement service if the event cannot be serviced. FIG. 10 shows the detailed example of the 'ReplacementEvent' element.

The 'ParentalRatingDescription' element of FIG. 6B has information indicating whether the service to be received corresponds to the parental lock condition and may not select the service corresponding to the parental lock condition. The 'ParentalRatingDescription' element may include the element which describes the lock reference such as age-based lock or country-based lock, and is an optional element.

The 'ParentalRatingDescription' element includes the information on the parental lock of the apparatus for receiving the digital contents according to a predetermined rating. If the service event information is included in the service discovery record, the parental lock is not performed after the receiver selects the service and receives the information on the parental lock from the TS, that is, the parental lock is performed in the step of selecting the service. Accordingly, the locked service can be prevented from being unnecessarily parsed and decoded in order to view the digital contents and thus the network resource can be efficiently used.

FIGS. 7A and 7B are views showing the service discovery record by an eXtensible markup language (XML) schema. In FIGS. 7A and 7B, the continuous schema is divided for the sake of convenience. In FIG. 7A, the 'Name', 'Description', 'EventDescriptionLocation', 'ContentGenre', 'ComponentDescription', 'ReplacementEvent' and 'ParentRating' elements are the service event information and the information of each element is shown in detail in FIG. 6B. The 'EventType', 'EventID', 'StartTime', 'Duration', 'RunningStatus' and 'PrimaryEISource' attributes of the service event information are shown in detail in FIG. 6B.

'The EventType' attribute of FIG. 7A may indicate whether the event is the present event according to the example of the 'EventType' of FIG. 7B.

The 'EventID' attribute of FIG. 7A indicates that the information for identifying the event in the service is set according to the 'EventId' defined by 'simpleType' of FIG. 7B.

The 'RunningStatus' attribute of FIG. 7A may be defined by the 'RunningStatus' defined by 'simpleType' of FIG. 7B and the 'PrimaryEISource' attribute of FIG. 7A includes the information indicating whether the service event information follows the event information of the record or the event information in the stream according to the 'PrimaryEISource' of the 'simpleType of FIG. 7B.

The 'ContentGenre' element of FIG. 7A indicates the genre of the service according to the 'Genre2level' defined in FIG. 7B and the 'ComponentDescription' element of FIG. 7A may be defined according to the 'ComponentDescription' of 'complexType of FIG. 7B. The element or the attribute included in the 'ComponentDescription' of FIG. 7B will be described in detail with reference to FIGS. 9A to 9C.

The 'ParentalRating' element of FIG. 7A may be defined by the country or the age according to the 'ParentRating' of FIG. 7B. The 'ParentRating' of FIG. 7B will be shown in detail in FIG. 10.

In the example of FIG. 7B, the 'EventType', 'EventID', 'StartTime', 'RunningStatus' and 'PrimaryEISource' attributes may be defined by the 'simpleType' of the XML. And the 'Genre2Level', 'ComponentDescription' and 'Parental Rating' may be defined by the 'complexType' of the XML. Like this example, the service event information may be included in the service discovery record and be transmitted/received.

Figure 8:
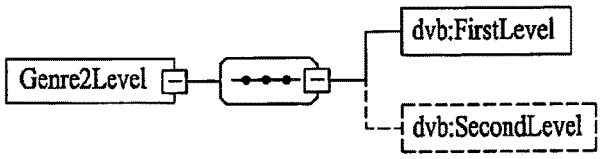
FIG. 8 is a view showing an example of the structure of a 'ContentGenre' element.

FIG. 8 is a view showing an example of the structure of the 'ContentGenre' element. The 'ContentGenre' element may have two level types of the genre. For example, the 'ContentGenre' element may have the element according to the two level types, such as content_nibble_level1 and content_nibble_level2 defined in the DVB system.

Figure 9A:
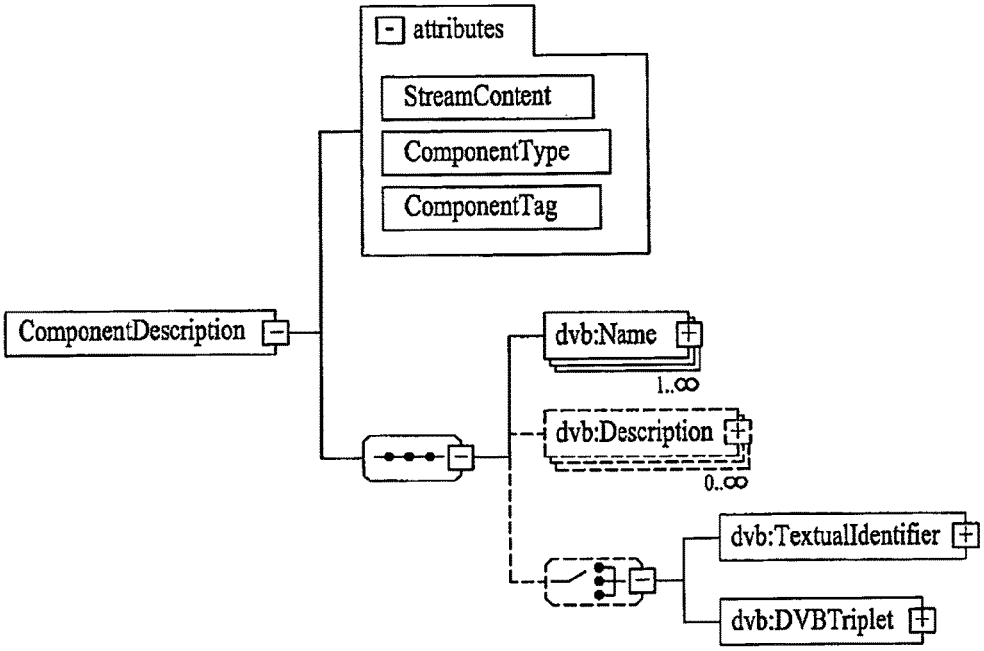
FIG. 9A is a view showing the structure of a 'ComponentDescription' element.
Figure 9B:
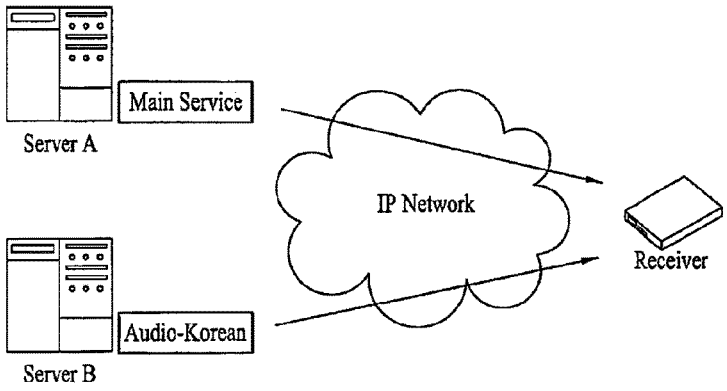
FIG. 9B is a view showing the concept of the reception of a stream according to the 'ComponentDescription' element.
Figure 9C:
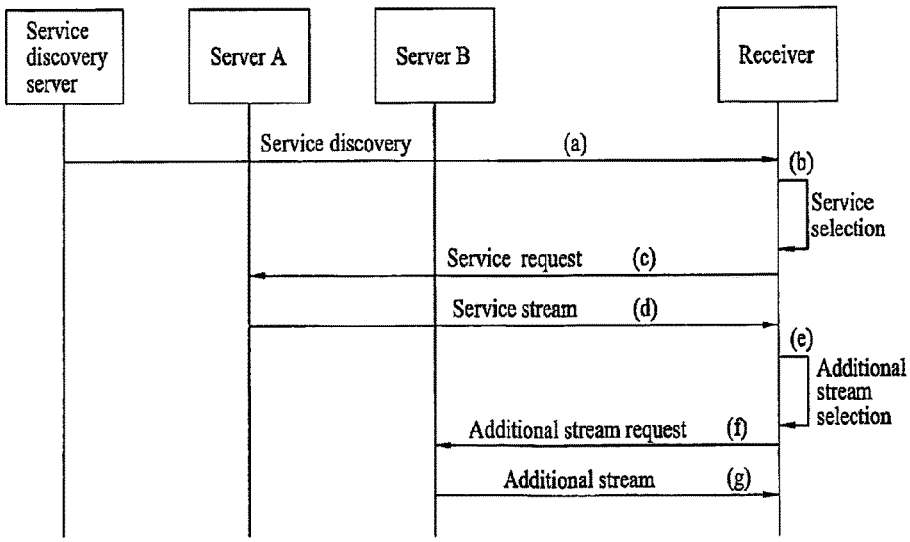
FIG. 9C is a view showing the flow of the reception of the stream according to the 'ComponentDescription' element.

FIGS. 9A to 9C show the structure of the 'ComponentDescription' element. In FIG. 6B, the information for identifying the stream received through the IP network according to the URI of the IP network is described in the 'ComponentDescription' element. FIG. 9A shows the attribute of the 'ComponentDescription' element. The 'streamcontent' and the 'ComponentType' attributes follow the table 26 of ETSI EN 300 469. If the 'ComponentDescription' element includes 'DVBTriplet' or 'Textual Identifier', the 'componentstream' included in the stream according to the IP address other than the TS stream including a specific event can be identified.

Here, 'DVBTriplet' may include a network identifier, a transport stream identifier and service identifier information of the transmission system. For example, the 'DVBTriplet' may include the information such as a network ID, a transport stream ID and a service ID according to the transmission method for providing the service (for example, if the service is provided according to the DVB standard). The 'TextualIdentifier' may represent the location of the service provider registered in, for example, the Internet DNS domain name as the textual location information for identifying the service provider. Accordingly, the apparatus for receiving the digital contents can identify and receive the stream using the information on the URI of the stream received by the IP.

In FIG. 9A, the 'ComponentDescription' element may include at least one 'Name' element and an optional 'Description' element. If the 'Description' element is included, the 'DVBTriplet' and the 'Textual Identifier' may be included.

In FIG. 9A, the 'ComponentDescription' element may include 'streamcontent', 'contentType' and 'contentTag' as the attribute for identifying the stream as shown in FIG. 7B.

FIG. 9B is a view showing the conceptual example in which the digital contents are output in the receiver using the 'ComponentDescription' element.

If the contents are received and output through the IP network, the video stream of the TS can be received from a content server A using the IP. Meanwhile, the audio can be selected to the stream including the audio information having a language different from the language included in the video from a content server B through the IP network. The video received from the content server A and the audio received from the content server B can be output as a single digital content. A caption expressed in the language which is not included in the video TS is received from a third server through the IP network and is output together with the contents.

FIG. 9C is a view showing the flow of the reception of the contents according to the 'ComponentDescription' element, which is the service information of FIG. 9A, through the other IP network of the conceptual diagram of FIG. 9B.

The apparatus for receiving the digital contents receives the service discovery record from the service discovery server (a). In this case, the service event information shown in FIGS. 4 and 9A may be included.

The apparatus for receiving the digital contents selects the service provided by a first service server (server A) of the first service provider from the service discovery record (b).

The service including the digital contents is requested from the first service server (c). The service stream is received from the first service server (d). According to the example of FIG. 9B, the digital contents received from the first service server may be the video stream associated with a movie.

The service discovery record received in the step (a) includes the service event information through the other network, and the service event information includes the 'ComponentDescription' element shown in FIG. 9A. Accordingly, an additional service which can be provided by a second service server according to the IP is selected (e).

According to the example of FIG. 9B, the second service server may have the audio stream having the language different from that of the movie provided by the first service server. Accordingly, the apparatus for receiving the digital contents makes a request for the additional service to the second service server using the service event information of FIG. 9A (f).

The second service server transmits the additional service corresponding to (f) (g).

FIG. 10 is a view showing the structure of the 'ReplacementEvent' element of FIG. 6B. The attribute of the 'ReplacementEvent' element may follow the table 56 of ETSI EN 300 468. If the viewing of the event which is currently being viewed becomes impossible, the event may be replaced with a specific service using this element. The 'ReplacementEvent' element is optional.

Figure 11:
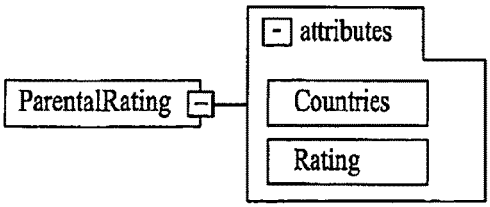
FIG. 11 is a view showing the structure of a 'ParentalRating' element.

FIG. 11 is a view showing the structure of the 'ParentalRatingDescription' element. The 'ParentalRatingDescription' element may include the 'countries' element describing the parental lock reference determined according to the countries and the 'rating' element describing the parental lock reference according to the ages. In the step of selecting the service, the parental lock is performed according to the reference. The parental lock may be followed by a rating criteria other than this example.

Unlike the above-described embodiment, the service discovery record includes only the identifier of the payload including only the service event information, and the payload according to the identifier may include the service event information. Hereinafter, this embodiment is called a second example. The apparatus for receiving the digital contents can obtain the payload including only the service event information from the payload in the service discovery step.

If the service event information is added to a low-level record such as the broadcast or COD discovery record of the service discovery record, the size of the service discovery record may be increased and a time necessary for receiving the service discovery record may be increased. In this case, the service discovery record includes only the identifier of the payload including the service event information and the service event information can be separately obtained from the payload including the service event information.

Figures 12, 13:
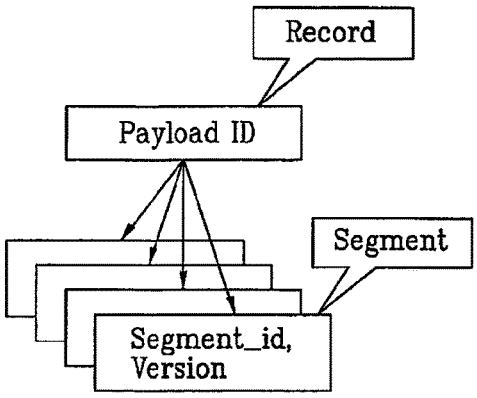
FIG. 12 is a view showing a hierarchical structure of a service discovery record.
FIG. 13 is a view showing an identifier of a separate payload including only service event information in the service discovery record.

FIG. 12 shows a relationship between the payload ID and the segment in the method of transmitting/receiving the digital contents and FIG. 13 shows an example of the payload ID value. Referring to FIG. 12, the service discovery record may include the payloads identified by the payload IDs and at least one segment included in each of the payloads.

Among them, the identifier of the service event information may be included in any one payload and be transmitted. The service discovery record may include the payload including data necessary for providing the service and the payload including the service event information. Accordingly, since the apparatus for transmitting/receiving the digital contents receives the payload including only the service event information independent of the digital contents, the service including the digital contents can be rapidly output.

Referring to FIG. 13, the identifier of the payload including the service provider discovery information may be set to 0x01, the identifier of the payload including the broadcast discovery information may be set to 0x02, and the identifier of the payload including the COD discovery information may be set to 0x03. The service event information may be included in the payload according to the identifier such as 0x02 or 0x03. However, in the example of FIG. 13, the identifier (ID) of the payload including only the service event information is set to 0XA0. If the payload is received according to the identifier of the payload of FIG. 13, the service event information can be received independent of the payload of the service discovery record (for example, the broadcast discovery payload and the COD discovery payload) of the service including the digital contents.

Figure 14:
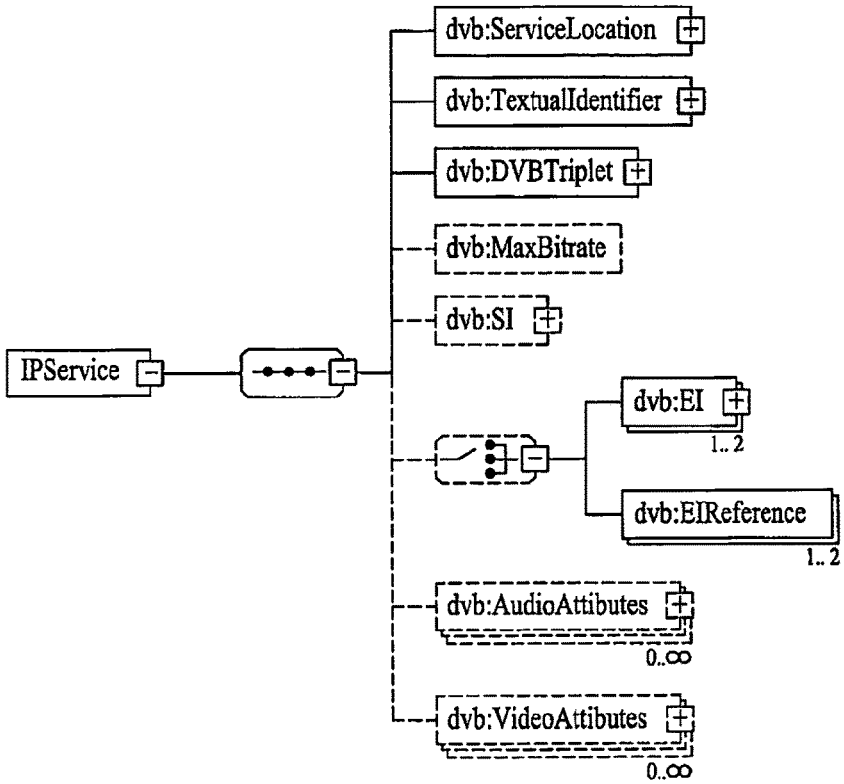
FIG. 14 is a view showing a second example of a service discovery record according to a method of receiving digital contents.

FIG. 14 is a view showing the service discovery record of the second example. The IPservice indicating the broadcast discovery record of the service discovery record may include any one of an 'EIReference' element and an 'EI' element. The example of the 'EI' element included in the service discovery record is described in the first example. If the service discovery record includes the 'EIReference' element, the element including only the service event information may be included.

Figure 15:
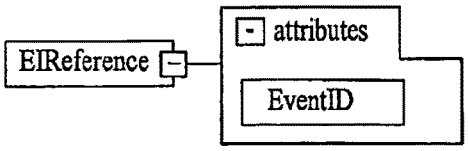
FIG. 15 is a view showing the structure of an 'EIReference' element of FIG. 14.

FIG. 15 is a view showing the structure of the 'EIReference' element of FIG. 14. The 'EIReference' element may have the 'EventID' attribute and the 'Event ID' includes the identifier for identifying the element including the service event information.

Figure 16:
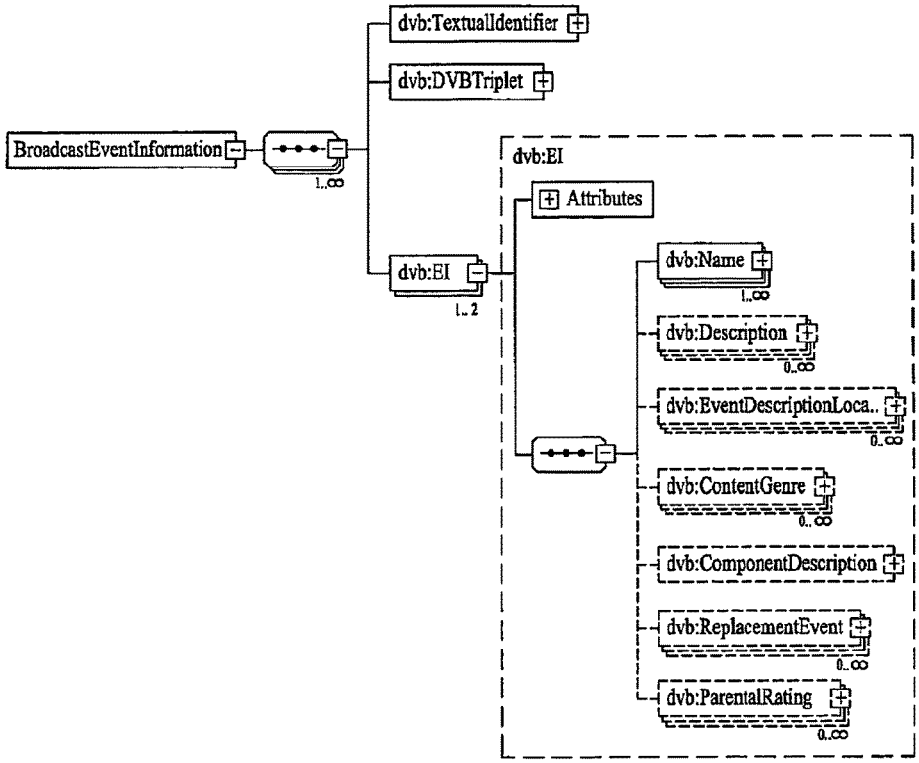
FIG. 16 is a view showing an example in which service event information is included in the service discovery record, according to the second example of the service discovery record.

FIG. 16 shows the element which can be identified according to FIG. 15 and separately includes only the service event information. If the service event information is received independent of the provided service according to the second example, the service event information is shown by a 'BroadcastEventInformation' element in FIG. 16.

The 'BroadcastEventInformation' element includes a 'TextualIdentifier' element including the textual identifier of the location of the service and a 'DVBTriplet' element indicating the identifier of the TS for identifying the services. The service event record includes the service event information. The apparatus for receiving the digital contents divides the service locations and the services through the 'DVBTriplet' or 'TextualIdentifier' and identifies service event information through the service event identifier.

The service event information included in the 'BroadcastEventInformation' element includes the elements for the attribute describing the attribute of the service event information and the detailed service event information described in the first example. In FIG. 16, the description of the elements included in the 'EI' element refers to the elements having the same names as that of FIG. 5.

FIG. 17 is a view showing the service discovery record of the second example by the XML schema. In FIG. 17, the service discovery record (IP service element) includes the element (a) including the service event information (EI) and the 'EIReference' element (b) including the identifier of the payload if the service event information is included in the separate payload. The detailed structure of the 'EIReference' element (b) is as follows.

The 'EIReference' element (c) includes the attribute of the 'EventID' element and this attribute may include the information for identifying the element (d) including the service event information.

The 'BroadcastEventInformation' element (d) including the service event information includes the 'EI' element including the detailed service event information. Accordingly, the apparatus for receiving the digital contents can separately receive the service event information from the service discovery record in the service discovery step, such that the service is rapidly output from the apparatus for receiving the digital contents.

Figure 18:
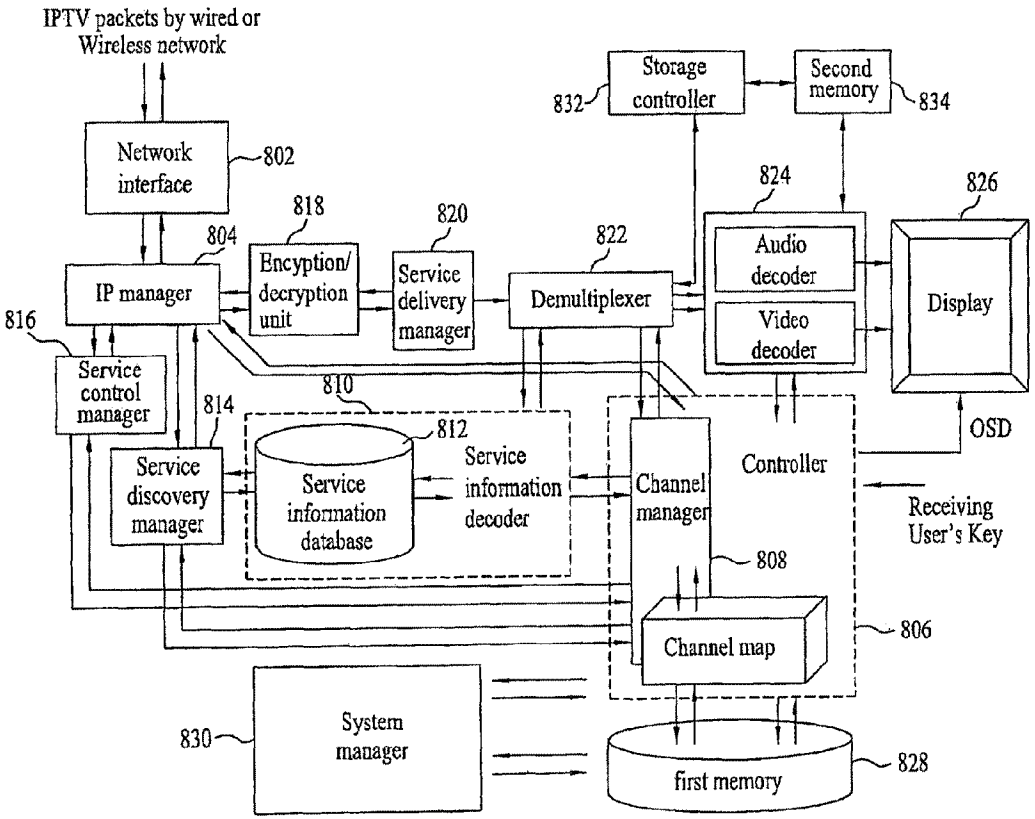
FIG. 18 is a block diagram showing the configuration of an apparatus for receiving digital contents.

FIG. 18 is a block diagram showing the configuration of the apparatus for receiving the digital contents.

Referring to FIG. 18, the apparatus for receiving the digital contents includes a network interface 802, an IP manager 804, a controller 806, a channel manager (CM) 808, a service information decoder 810, a service information database 812, a service discovery manager 814, a service control manager 816, a encryption/decryption unit 818, a service delivering manager 820, a demultiplexer 822, an audio/video decoder 824, a display 826, a first memory 828, a system manager 830, a second memory 834 and a storage controller 832. The service information decoder 810, the demultiplexer 822 and the audio/video decoder 824 are collectively called a decoding unit.

The network interface 802 receives packets from a network and transmits packets to the network. The packets which are received by the network interface 802 from the network may include the service discovery record including the service event information.

The IP manager 804 can process a transmission/reception packet according to an IP protocol for setting information on a source and destination with respect to a packet received by the receiver and a packet transmitted by the receiver.

The encryption/decryption unit 818 performs the CAS (conditional access system) function and the DRM (digital rights management) function with respect to the packet received from the IP manager 804 or the packet received from the service delivering manager 820. Accordingly, a packet to be transmitted is encrypted and a received packet is decrypted.

The service delivering manager 820 can control the service including the digital contents received by the IP protocol in real time. For example, if real-time streaming data is controlled, the service data can be controlled using a real-time transport protocol/RTP control protocol (RTP/RTCP). The real-time streaming data can be transmitted using the RTP. The service delivering manager 820 can parse the received data packet according to the RTP and output the data packet to the demultiplexer 822. The network reception information is fed back to the server for providing the service using the RTCP.

The demultiplexer 822 may demultiplex a program specific information (PSI) section, a program and service information protocol (PSIP) section, or a service information (SI) section and video/audio data units.

The service information decoder 810 decodes the sections associated with the services demultiplexed by the demultiplexer 822 and stores the decoded service information in the service information database 812.

The video/audio decoder 824 decodes the video data and the audio data demultiplexed by the demultiplexer 822. The video/audio data decoded by the video/audio decoder 824 is output through an output unit. In the example shown in FIG. 18, the video data is provided to the user through the display 826 and the decoded audio data is provided to the user through a speaker (not shown).

The service control manager 816 selects and controls the service. For example, if the user selects a live broadcasting service of the existing broadcasting, the service is selected and controlled using IGMP or RTSP and, if the user selects the service such as a video on demand (VOD), the service is selected and controlled using the RTSP. The RTSP protocol can provide a trick mode to a real-time stream.

The service discovery manager 814 controls information necessary for selecting the service provider for providing the service. The service discovery manager 814 may receive a control signal for channel selection from the controller 806 and search for the service according to the control signal. The service discovery manager 814 can parse the service discovery record which can obtain the digital contents configuring the service.

The controller 806 controls the operation of the receiver according to a user control signal received through an on-screen display (OSD) and a graphic user interface (GUI) for a user. For example, if a key input signal for selecting a channel is received from the user, the key input signal is transmitted to the channel manager (CM) 808.

The channel manager 808 may generate a channel map. In addition, the channel manager 808 may select a service according to the key input signal received from the controller 806 and output service discovery information of the service selected by the service discovery manager 814. Further, the channel manager (CM) 808 may receive the service information associated with the service from the service information decoder 810 and generate the channel map. The channel manager 808 may receive the information associated with the service from the service discovery manager 814 or the service information decoder 810 and generate the channel map according to the services. The channel manager 808 may control the demultiplexer 822 to selectively output an audio/video packet identifier (PID) of the channel selected by the user.

The first memory 828 stores setup data of the system. The first memory may include a nonvolatile RAM (NVRAM) or a flash memory.

The system manager 830 controls the overall operation of the receiver system through a power source.

The second memory 834 receives and stores the video/audio data from the video/audio decoder 824 under the control of the storage controller 832. The second memory 834 performs a personal video recorder (PVR) function and the storage controller 832 can control the input/output of the digital contents to allow the second memory 834 to perform the PVR function.

The IP manager 804 parses the IP packet received by the network interface 802. The IP manager 804 checks the destination address of the received packet and processes and outputs the packet according to the transmission/reception protocol. The service discovery record including the service event information may be included in the IP packet received by the IP manager 804. The IP manager 804 may transmit the parsed packet to the service discovery manager 814 according to the IP protocol.

The service event information may be included in the service discovery record according to at least one of the first example and the second example. The service event information is shown in FIGS. 4 to 17. The service discovery manager 814 may acquire the service event information in the service discovery record included in the received packet and transmit and store the service event information to and in the service information database 812. The service discovery manager 814 may process the received service discovery record according to, for example, the SD&D protocol and obtain the service event information.

The controller 806 can control the above-described components such that a desired service is output according to the key input signal of the user such that the digital contents are, for example, provided to the user. Since the service discovery manager 814 obtains the service event information from the service discovery record, the controller 806 allows the user to receive the service according to the service event information in the service discovery step. The service discovery manager 814 may identify and parse the payload of the service discovery record including only the service event information. Accordingly, the controller 806 may prevent the output of the service from being delayed due to a large amount of service event information even in the service discovery step.

The service information decoder 810 receives and decodes the PSI section, the PSIP section or the DVB-SI section demultiplexed by the demultiplexer 822. Conventionally, the service information decoder 810 decodes the service information multiplexed with the digital contents in the transport stream, which are received in real time, and extracts the service event information. In contrast, according to the above-described embodiment, since the service event information may be included in the service discovery record, the service event information can be obtained earlier than the digital contents. Accordingly, the service event information decoded by the service information decoder and the service event information included in the service discovery record can be received together. The service discovery record may include the information indicating which of the service event information is used by the apparatus for receiving the digital contents if the two pieces of service event information are received together in the service information.

Figure 19:
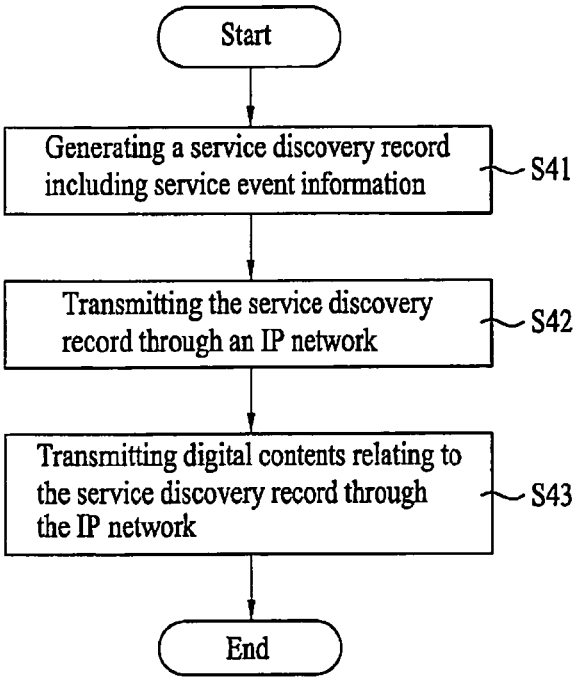
FIG. 19 is a flowchart illustrating the method of transmitting the digital contents.

FIG. 19 is a flowchart illustrating the method of transmitting the digital contents.

Referring to FIG. 19, the method includes a step S41 of generating a service discovery record including service event information of a service including digital contents, and a step S42 of transmitting the service discovery record through an IP network when the generated service discovery record is requested through the IP network.

And when the digital contents selected from the service discovery record are requested through the IP network, the digital contents are transmitted through the IP network (S43).

According to the method of transmitting/receiving the digital contents and the apparatus for receiving the digital contents of the above-described embodiment, it is possible to transmit/receive the service discovery record including the service event information for the digital contents. Accordingly, the broadcasting stream of the service channel, which is not selected when obtaining the service event information, does not need to be decoded and thus the network load can be reduced. In addition, since the service record can be carried by a separate payload, a necessary data is first received and provided to the user and additional event information is then received and provided to the user.

What is claimed is:

[1. A method of receiving digital broadcast contents through an internet network in accordance with an internet protocol (IP), the method comprising:

receiving, from the internet network, a payload carrying a broadcast discovery record including service information (SI) describing a service associated with the digital broadcast contents, the broadcast discovery record including transmission identification information for identifying a transport stream carrying service event information of the service, wherein the transmission identification information is link information between the service event information and the service and wherein the link information includes a network identifier, a transport stream identifier, and a service identifier;

parsing the payload to obtain the transmission identification information;

receiving, from the internet network, the transport stream including the service event information by using the transmission identification information; and parsing the transport stream to obtain the service event information.]

[2. The method according to claim 1, wherein the service event information includes at least one of information indicating whether an event of the service event information is a present event or a following event, information for identifying a service event, information indicating a start time of the service event, information indicating a duration of the event, information indicating a running status of the event, and information indicating which one of the service event information in a transport stream and the service event information in extensible markup language (XML) format takes priority.]

[3. The method according to claim 1, wherein the service event information includes at least one of information indicating a name of the service event information, information describing the service event information, information for identifying the payload when a payload that includes detailed information of the event is present, information describing components including the digital broadcast contents associated with the service, information indicating replacement event information with which the service event information is replaced, and information indicating a parental rating of the service.]

[4. The method according to claim 3, wherein the information describing the components including the digital broadcast contents associated with the service includes information on a stream component included in a transport stream different from a transport stream of the digital broadcast contents.]

[5. The method according to claim 3, wherein the information describing the components including the digital broadcast contents associated with the service includes information on a stream component which can be received from a uniform resource identifier (URI) different from a URI of an IP packet of the digital broadcast contents.]

[6. The method according to claim 3, wherein the information indicating the replacement event information with which the service event information is replaced, includes a textual identifier which can receive the replacement event information and a stream identifier on a network which can receive the replaced event information.]

[7. An apparatus receiving a service associated with digital broadcast contents through an internet network in accordance with an internet protocol (IP), the apparatus comprising:

an interface configured to receive a payload and a transport stream from the internet network, wherein the payload carries a broadcast discovery record including service information (SI) describing a service associated with the digital broadcast contents, the broadcast discovery record including transmission identification information for identifying a transport stream carrying service event information of the service and wherein the transmission identification information is link information between the service event information and the service and the transmission identification information includes a network identifier, transport stream identifier, and service identifier in a transmission system;

an IP manager configured to parse the payload and parse the transport stream using the transmission identification information parsed from the payload;

a service discovery manager configured to obtain the service event information from the transport stream using the transmission identification information;

a decoder configured to decode the service event information;

a controller configured to control the obtained service event information and the decoded digital broadcast contents to be output; and a display configured to output the service event information and the digital broadcast contents according to a control signal of the controller.]

[8. The apparatus according to claim 7, the service event information includes at least one of information indicating whether an event of the service event information is a present event or a following event, information for identifying a service event, information indicating a start time of the service event, information indicating a duration of the event, information indicating a miming status of the event, and information indicating which one of the service event information in a transport stream and the service event information in extensible markup language (XML) format takes priority.]

[9. The apparatus according to claim 7, wherein the service event information includes at least one of information indicating a name of the service event information, information describing the service event information, information for identifying the payload when a payload that includes detailed information of the event is present, information describing components including the digital broadcast contents associated with the service, information indicating replacement event information with which the service event information is replaced, and information indicating a parental rating of the service.]

[10. The apparatus according to claim 9, wherein the information describing the components including the digital broadcast contents associated with the service includes information on a stream component included in a transport stream different from a transport stream of the digital broadcast contents.]

[11. The apparatus according to claim 9, wherein the information describing the components including the digital broadcast contents associated with the service includes information on a stream component which can be received from a uniform resource identifier (URI) different from a URI of an IP packet for transmitting the digital broadcast contents.]

[12. A method of transmitting digital broadcast contents included in a service in a system connected by an internet protocol (IP) network, the method comprising:

generating a service discovery record including service event information of the service, and transmitting the service discovery record through the IP network when the generated service discovery record is requested through the IP network, the service discovery record including service information (SI) describing a service associated with the digital broadcast contents and being carried via a payload, wherein the service discovery record has transmission identification information for identifying a transport stream carrying service event information of the service, wherein the service discovery record and the service event information are separately transmitted, wherein the transmission identification information links the service event information with the service associated with the digital broadcast contents, and wherein the transmission identification information is link information between the service event information and the service, and the transmission identification information includes a network identifier, transport stream identifier, and service identifier in a transmission system.]

[13. The method according to claim 12, further comprising: transmitting the digital broadcast contents through the IP network, when the digital broadcast contents related to the service discovery record are requested through the IP network.]

*14. A method of receiving digital broadcast contents in accordance with an internet protocol (IP), the method comprising:*

*receiving a payload carrying service discovery information including service information (SI) describing a service associated with the digital broadcast contents, the service discovery information including transport stream identification information identifying a transport stream carrying service event information of the service,*

*wherein the service discovery information including the transport stream identification information is used for linking the service event information to the service; and*

*after receiving the transport stream identification information, receiving the transport stream including the service event information of the service by using the transport stream identification information,*

*wherein the service discovery information includes information for specifying a type of the service and information for indicating a name of the service,*

*wherein the type of the service corresponds to an audio/video service or audio only service.*

*15. The method according to claim 14, wherein the service event information includes at least one of information indicating whether an event of the service event information is a present event or a following event, information for identifying a service event, information indicating a start time of the service event, information indicating a duration of the event, information indicating a running status of the event, and information indicating which one of the service event information in a transport stream and the service event information in extensible markup language (XML) format takes priority.*

*16. The method according to claim 14, wherein the service event information includes at least one of information indicating a name of the service event information, information describing the service event information, information for identifying the payload when a payload that includes detailed information of the event is present, information describing components including the digital broadcast contents associated with the service, information indicating replacement event information with which the service event information is replaced, and information indicating a parental rating of the service.*

*17. The method according to claim 16, wherein the information describing the components including the digital broadcast contents associated with the service includes information on a stream component which can be received from a uniform resource identifier (URI) different from a URI of an IP packet of the digital broadcast contents.*

*18. The method according to claim 16, wherein the information indicating the replacement event information with which the service event information is replaced, includes a textual identifier which can receive the replacement event information and a stream identifier on a network which can receive the replaced event information.*

*19. A method of transmitting digital broadcast contents included in a service in a system connected by an internet protocol (IP) network, the method comprising:*

*generating service discovery information including service event information of the service, and transmitting the service discovery information through the IP network when the generated service discovery information is requested through the IP network, the service discovery information including service information (SI) describing a service associated with the digital broadcast contents and being carried in a payload,*

*wherein the service discovery information has transport stream identification information for identifying a transport stream carrying service event information of the service,*

*wherein the service discovery information and the service event information are separately transmitted,*

*wherein the service discovery information including the transport stream identification information that links the service event information with the service associated with the digital broadcast contents, and*

*wherein the service discovery information including the transport stream identification information is used for linking the service event information to the service.*

*20. The method according to claim 19, further comprising: transmitting the digital broadcast contents through the IP network, when the digital broadcast contents related to the service discovery information are requested through the IP network.*

* * * * *